United States Patent
Kato et al.

(10) Patent No.: US 6,318,872 B1
(45) Date of Patent: Nov. 20, 2001

(54) VEHICLE LIGHT METER HAVING TWO COLORED LAYERS WITH RING MEMBER DIAL

(75) Inventors: Takahira Kato, Kariya; Satoru Tamura, Anjo, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/577,352

(22) Filed: May 24, 2000

(30) Foreign Application Priority Data

May 25, 1999 (JP) .................................................. 11-145331
Dec. 22, 1999 (JP) .................................................. 11-365038

(51) Int. Cl.[7] .................................................. G01D 11/28
(52) U.S. Cl. .............................. 362/26; 362/27; 362/216; 362/293; 362/583
(58) Field of Search .............................. 362/26, 27, 583, 362/216, 293; 116/286, 287, DIG. 36

(56) References Cited

U.S. PATENT DOCUMENTS 4,975,807 * 12/1990 Ohashi ..................................... 362/23
5,142,453 * 8/1992 Ohta et al. ............................... 362/29
6,210,011 * 4/2001 Ikeuchi et al. .......................... 362/26

* cited by examiner

*Primary Examiner*—Sandra O'Shea
*Assistant Examiner*—Ronald E. Delgizzi
(74) *Attorney, Agent, or Firm*—Law Offices of David G. Posz

(57) ABSTRACT

A meter for a vehicle has a dial, a light transmitting ring member surrounding the dial, a lamp disposed at a rear side of the dial/ring member and an orange-colored layer disposed between the dial/ring member and the lamp. A surface of the ring member is covered by a silver paint layer except a front surface thereof. When the lamp is lit, light emitted from the lamp enters the orange layer, and the orange layer emits orange-colored light. The orange light enters the ring member and is emitted from the front face thereof, whereby the front face is illuminated by orange light and appears orange color. When the lamp is turned off, the silver paint layer becomes visible through the front face, whereby the front face appears silver color. Therefore, the meter looks novel and original due to the ring member.

16 Claims, 4 Drawing Sheets

VEHICLE LIGHT METER HAVING TWO COLORED LAYERS WITH RING MEMBER DIAL

CROSS REFERENCE TO RELATED APPLICATIONS

This application relates to and claims priority from Japanese Patent Application Nos. 11-145331 filed on May 25, 1999 and 11-365038 filed on Dec. 22, 1999, the contents of which are hereby incorporated by reference.

BACKGROUND OF THE INVENTION

1. Field of the Invention

The present invention relates generally to meters, and particularly to a meter for a vehicle.

2. Related Art

A conventional meter for a vehicle has a circular dial and a ring member attached to the dial to surround the dial. A surface of the ring member is painted with silver paint. However, the meter may look ordinary and uniform.

SUMMARY OF THE INVENTION

In view of the foregoing problems, it is an object of the present invention to provide a meter which looks novel and original.

According to the present invention, a meter has a dial, a ring member having an annular light transmitting member disposed along a periphery of the dial and a first colored layer having a first color and disposed on an inner side face and an outer side face of the light transmitting member, a light source disposed at a rear side of the ring member for emitting light and a second colored layer having a second color and disposed between the light source and the ring member. The light transmitting member has a light emitting portion for emitting light toward a front side.

When the light source is turned on, the light source emits light toward the second colored layer. Light enters the second colored layer, and the second colored layer emits light of the second color toward the ring member. Then, light of the second color enters the ring member and is emitted from the light emitting portion. As a result, the light emitting portion of the ring member is illuminated by light of the second color and appears the second color. When the light source is turned off, the first colored layer becomes visible through the light emitting portion, and the light emitting portion appears the first color. Therefore, the meter looks novel and original due to the ring member.

BRIEF DESCRIPTION OF THE DRAWINGS

This and other objects and features of the present invention will become more readily apparent from a better understanding of the preferred embodiments described below with reference to the accompanying drawings, in which.

DETAILED DESCRIPTION OF THE PREFERRED EMBODIMENTS

Preferred embodiments of the present invention are described hereinafter with reference to the accompanying drawings.

(First Embodiment)

Figure 1:
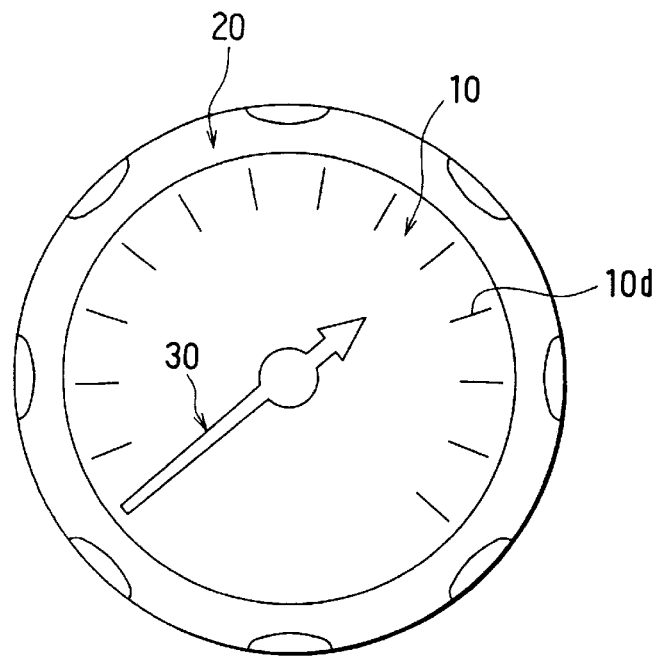
FIG. 1 is a schematic front view showing a speedometer for a vehicle according to a first preferred embodiment of the present invention.
Figure 2:
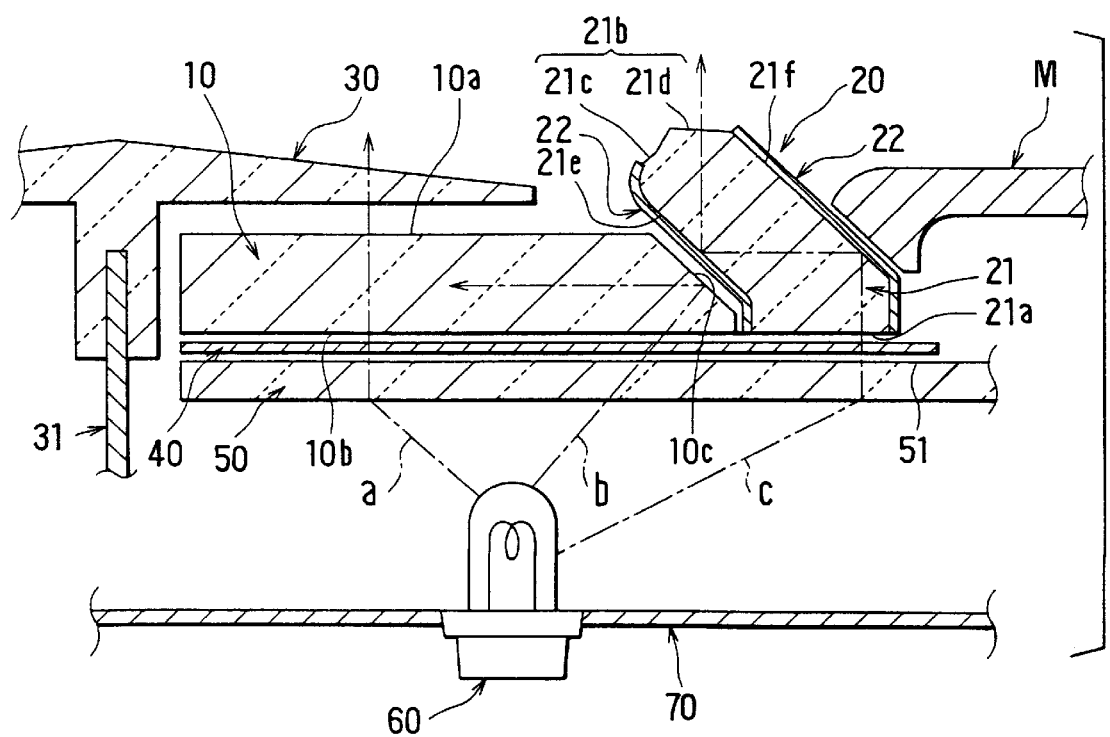
FIG. 2 is a partial enlarged sectional view showing the speedometer according to the first embodiment.
Figure 3:
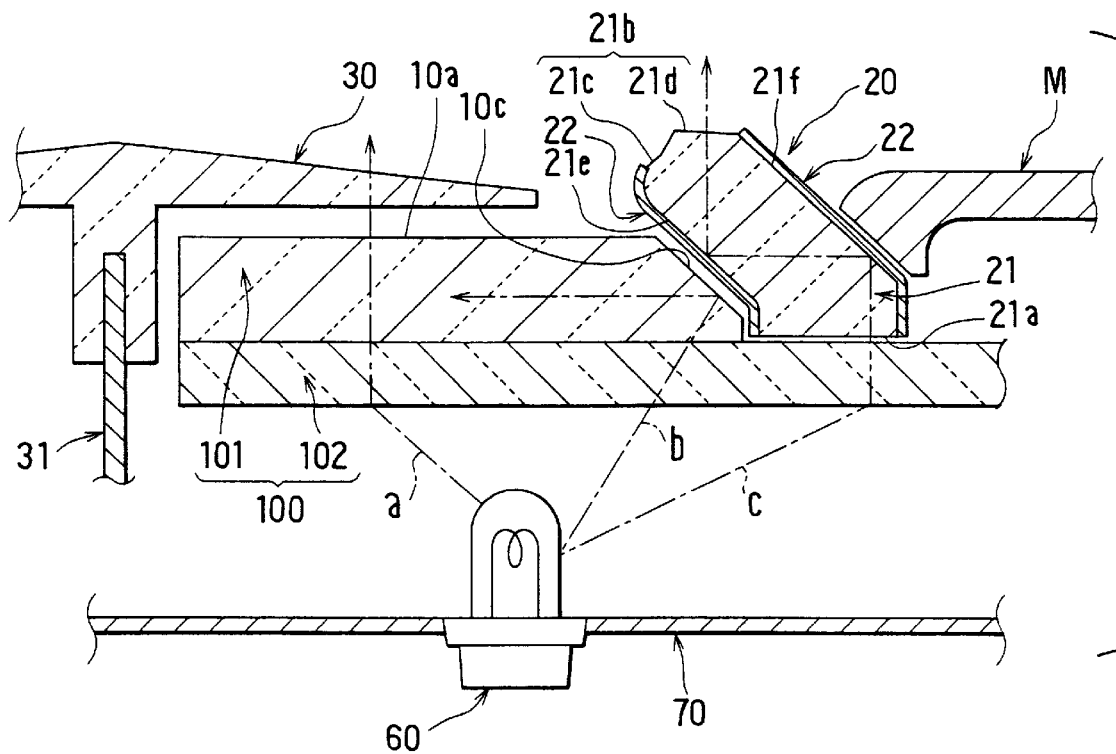
FIG. 3 is a partial enlarged sectional view showing the speedometer according to a modification of the first embodiment.

A first preferred embodiment of the present invention will be described with reference to FIGS. 1–3. As shown in FIG. 1, a speedometer for a vehicle has a dial 10, a ring member 20 and a light transmitting pointer 3. The dial 10 is made of a substantially circular transparent resin plate. A scale 10d is printed in an arc-shape on a back of the dial 10. As shown in FIG. 2, the speedometer also has a orange-colored layer 40 (hereinafter referred to as orange layer 40), a light transmitting plate 50 and a lamp 60. The pointer 30 is connected to a pointer shaft 31 of a drive unit (not shown). The speedometer is held by a holding plate M.

The orange layer 40 is disposed at a front side (i.e., upper side in FIG. 2) of the light transmitting plate 50 to face a front face 51 of the light transmitting plate 50. The dial 10 is disposed at a front side of the orange layer 40. Therefore, the orange layer 40 is disposed between the light transmitting plate 50 and the dial 10. The dial 10 has a front face 10a facing a front side, a back 10b facing the orange layer 40 and a peripheral surface 10c formed along a periphery thereof. Since a peripheral portion of the dial 10 is decreased in thickness toward the periphery of the dial 10, the peripheral surface 10c extends obliquely from the front face 10a to the back 10b.

The ring member 20 has a light transmitting member 21 made of a light transmitting material through which light can pass and a silver paint layer 22 made of silver paint. The light transmitting member 21 is formed into an annular shape to surround the peripheral surface 10c of the dial 10. The light transmitting member 21 is disposed at a front side (i.e., upper side in FIG. 2) of the light transmitting plate 50 with the orange layer 40 being disposed therebetween. Further, the light transmitting member 21 obliquely protrudes toward a center of the dial 10, and has a back 21a facing the orange layer 40 and a front face 21b bent into a V-shape and disposed at an protruding end (i.e., upper end in FIG. 2) thereof.

The silver paint layer 22 is formed on an inner side face 21e and an outer side face 21f of the light transmitting member 21. Therefore, the light transmitting member 21 is exposed only by the front face 21b. The front face 21b has an inner front face 21c formed next to the inner side face 21e and an outer front face 21d which extends in substantially parallel with the back 21a. The lamp 60 is disposed at a rear side (i.e., lower side in FIG. 2) of the light transmitting plate 50 for emitting light toward the light transmitting plate 50. The lamp 60 is attached to a case 70.

When the lamp 60 is lit in a dark environment such as at night or when the vehicle runs in a tunnel, light emitted from the lamp 60 enters the light transmitting plate 50, passes through the light transmitting plate 50 and enters the orange layer 40. As a result, orange-colored light is emitted from the orange layer 40. A part of the orange light emitted from the orange layer 40 enters the dial 10 as indicated by arrows "a" and "b" in FIG. 2, and is emitted from the front face 10a of the dial 10 as sheet orange light. As a result, the dial 10 is illuminated by orange light. A part of sheet orange light emitted from the front face 10a further passes through the pointer 30. As a result, the pointer 30 is illuminated by orange light.

The rest of the orange light emitted from the orange layer 40 enters the light transmitting member 21 of the ring member 20 from the back 21a as indicated by an arrow "c" in FIG. 2. The orange light having entered the light transmitting member 21 is reflected several times by the silver paint layer 22 within the light transmitting member 21, and is emitted from the front face 21b. As a result, the front face 21b is illuminated by orange light and appears orange color to a driver of the vehicle.

When the lamp 60 is turned off in a light environment such as in the daytime, the silver paint layer 22 is visible to the driver through the front face 21b. Therefore, the front face 21b appears silver color to the driver.

According to the first embodiment, when the lamp 60 is turned on, the front face 21b of the light transmitting member 21 of the ring member 20 is illuminated by orange light and appears orange color. When the lamp 60 is turned off, the silver paint layer 22 is visible through the front face 21b so that the front face 21b appears silver color. Therefore, the speedometer looks novel and original due to the ring member 20.

In the first embodiment, two layers having a different color from each other may be used instead of the single orange layer 40 so that light having a different color respectively enters the dial 10 and the ring member 20. Further, as shown in FIG. 3, the dial 1 may be modified into a dial 100. The dial 100 is integrally formed by a front member 101 and a rear member 102 which are made of an orange-colored light transmitting material. The rear member 102 is disposed at a rear side (i.e., lower side in FIG. 3) of the front member 101 and the ring member 20. Also, in the first embodiment, the silver paint layer 22 may be made of paint having any color which is different from the color of the orange layer 40, and the orange layer 40 may have any color.

(Second Embodiment)

A second preferred embodiment of the present invention will be described with reference to FIGS. 4 and 5. In this and following embodiments, components which are substantially the same as those in previous embodiments are assigned the same reference numerals. In the second embodiment, orange light is emitted from a part of a ring member whether the lamp 60 is lit or not.

Figure 4:
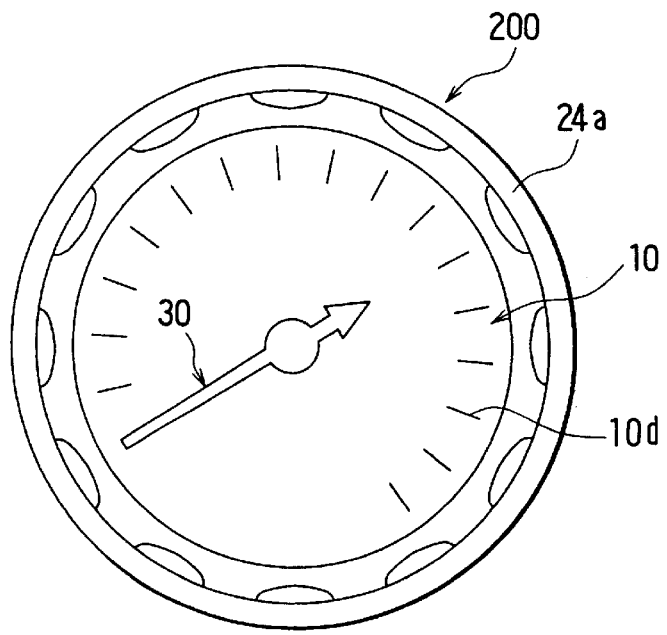
FIG. 4 is a schematic front view showing a speedometer for a vehicle according to a second preferred embodiment of the present invention.
Figure 5:
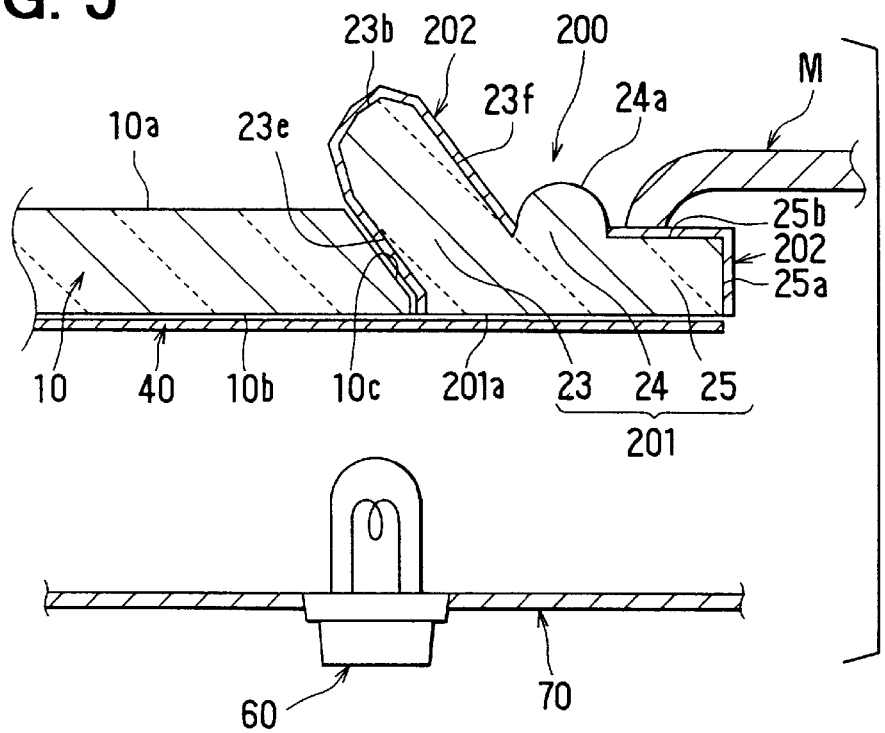
FIG. 5 is a partial enlarged sectional view showing the speedometer according to the second embodiment.

As shown in FIGS. 4 and 5, a ring member 200 has a light transmitting member 201 and a silver paint layer 202. The light transmitting member 201 has an inner portion 23, a protruding portion 24 and an outer peripheral portion 25. The inner portion 23 is formed to surround the peripheral surface 10c of the dial 10. The inner portion 23 obliquely protrudes from a back 201a of the light transmitting member 201 toward the center of the dial 10, and has a front face 23b at an protruding end thereof.

The protruding portion 24 is formed along an outer periphery of the inner portion 23 to have an annular shape. The protruding portion 24 protrudes toward a front side (i.e., upwardly in FIG. 5) and has a front face 24a at a protruding end thereof to have a semicircular cross section. The outer peripheral portion 25 is formed along an outer periphery of the protruding portion 24 to have an annular shape.

The silver paint layer 202 is formed on the front face 23b, an inner side face 23e and an outer side face 23f of the inner portion 23, an outer peripheral face 25a and a front face 25b of the outer peripheral portion 25. The silver paint layer 202 is formed by applying silver paint on the front face 23b, the inner side face 23e and the outer side face 23f, the outer peripheral face 25a and the front face 25b while masking the front face 24a of the protruding portion 24.

When the lamp 60 is lit in the dark environment, light emitted from the lamp 60 enters the orange layer 40 and is emitted from the orange layer 40 as orange light. The orange light emitted from the orange layer 40 enters the light transmitting member 201 from the back 201a and is reflected several times by the silver paint layer 202 within the light transmitting member 201. Then, the orange light is emitted from the front face 24a of the protruding portion 24. As a result, the front face 24a is illuminated by orange light and appears orange color to the driver.

When the lamp 60 is turned off in the light environment, natural light inside the vehicle enters the light transmitting member 201 from the front face 24a and is emitted from the back 201a. A part of light emitted from the back 201a is reflected by the orange layer 40 to become orange light. The reflected orange light again enters the light transmitting member 201 and is emitted from the front face 24a. As a result, the front face 24a appears orange color to the driver.

According to the second embodiment, the silver paint layer 202 formed on the front face 23b of the inner portion 23 and orange light emitted from the front face 24a of the protruding portion 24 are seen by the driver whether the lamp 60 is lit or not. As a result, the ring member 200 invariably appears silver and orange color, thereby making the speedometer look novel and original.

(Third Embodiment)

A third preferred embodiment of the present invention will be described with reference to FIG. 6. In the third embodiment, orange light is emitted from a part of a dial through a ring member whether the lamp 60 is lit or not.

Figure 6:
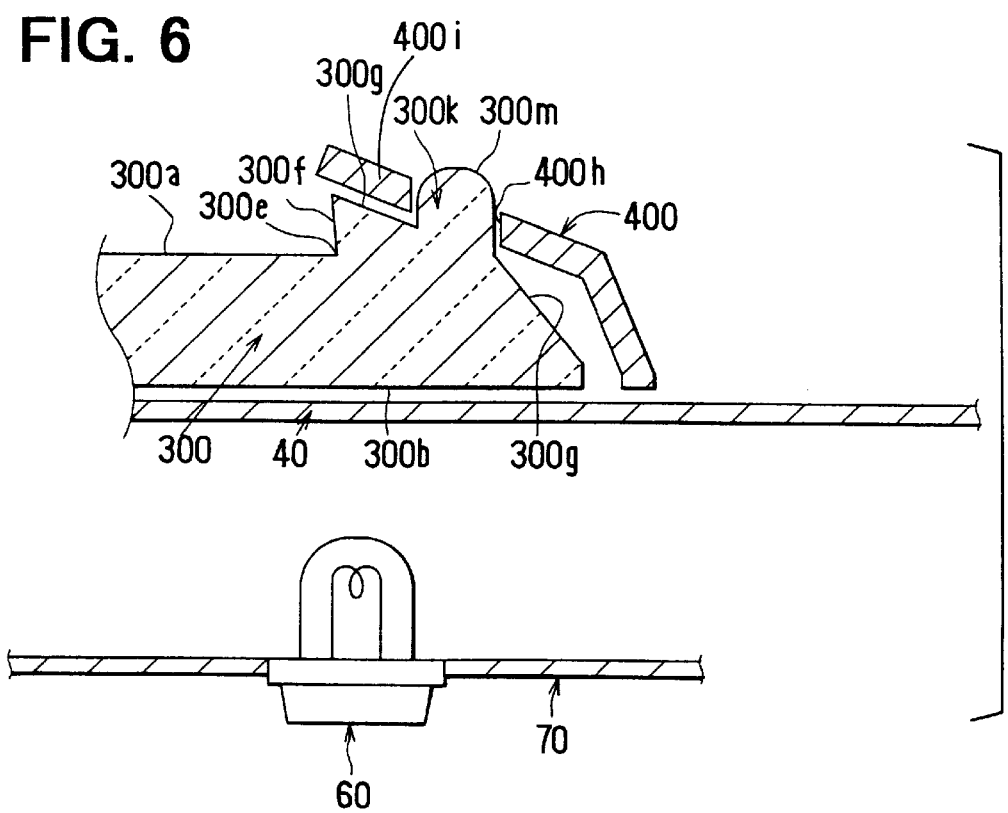
FIG. 6 is a partial enlarged sectional view showing a speedometer for a vehicle according to a third preferred embodiment of the present invention.

As shown in FIG. 6, a dial 300 has a front face 300a, an annular inner side face 300f upwardly extending from an end 300e of the front face 300a, an annular outer peripheral surface 300g and a back 300b. The outer peripheral surface 300g obliquely extends from the back 300b to the inner side face 300f. The dial 300 also has plural protrusions 300k protruding from the outer peripheral surface 300g. Each of the protrusions 300k has a front face 300m and has a semicircular cross section.

A light blocking ring member 400 through which light can not pass is disposed to cover the outer peripheral surface 300g of the dial 300. The ring member 400 has plural arc-shaped openings 400h arranged in a circle along a whole circumference of the ring member 400, and an annular inner portion 400i disposed at an inner side (i.e., a left side in FIG. 6) of the openings 400h. Each of the protrusions 300k of the dial 300 passes through each of the openings 400h to protrude upwardly in FIG. 6. When the inner portion 400i of the ring member 400 is held by an appropriate holding member, the plural arc-shaped openings 400h may be formed into a single annular opening.

When the lamp 60 is lit in the dark environment, light emitted from the lamp 60 enters the orange layer 40, and orange light is emitted from the orange layer 40 to enter the dial 300. A part of orange light having entered the dial 300 is emitted from the front face 300m of each of the protrusions 300k. As a result, the front face 300m is illuminated by orange light and appears orange color to the driver.

When the lamp 60 is turned off in the light environment, natural light inside the vehicle enters the dial 300 from the front face 300m of each of the protrusions 300k, and is emitted from the back 300b of the dial 300. Light emitted from the back 300b is reflected by the orange layer 40 to become orange light. A part of the reflected orange light again enters the dial 300 and is emitted from the front face 300m. As a result, the front face 300m appears orange color to the driver.

According to the third embodiment, the ring member 400 and orange light emitted from the front face 300m disposed in each of the openings 400h of the ring member 400 are seen by the driver whether the lamp 60 is lit or not. Therefore, the ring member 400 invariably appears a color of the ring member and orange color, and the speedometer looks novel and original. The ring member 400 may have any color which is different from the color of the orange layer 40.

(Fourth Embodiment)

A fourth preferred embodiment of the present invention will be described with reference to FIGS. 7–10. The fourth embodiment is a modification of the second embodiment.

Figure 7:
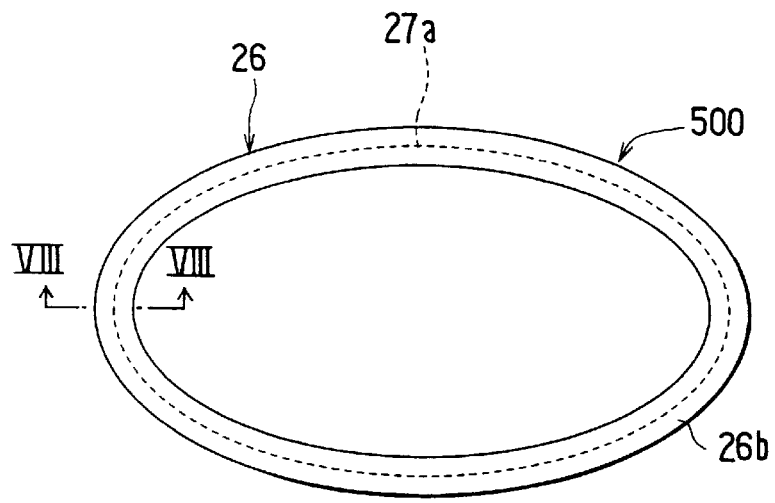
FIG. 7 is a perspective view showing a ring member of a speedometer for a vehicle according to a fourth preferred embodiment of the present invention.
Figure 8:
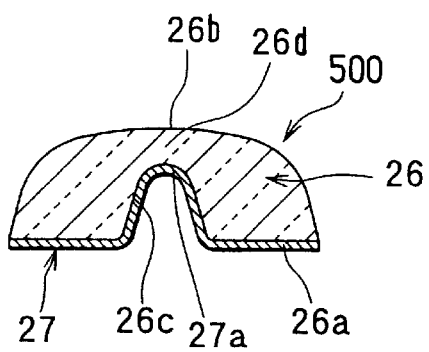
FIG. 8 is a sectional view taken along line VIII-VIII in FIG. 7.

In the fourth embodiment, as shown in FIGS. 7 and 8, a ring member 500 has an annular semitransparent light transmitting member 26 and an annular metallic-colored semitranslucent layer 27. The light transmitting member 26 is disposed between the dial 10 and the holding plate M and surrounds the dial 10. As shown in FIG. 8, the semitranslucent layer 27 is formed on a back 26a of the light transmitting member 26 by vapor deposition such as plating, hot-stamping coating or the like. As a result, the semitranslucent layer 27 is disposed between the light transmitting member 26 and the orange layer 40. The light transmitting member 26 has an arc-shaped front face 26b. The front face 26b faces upwardly to be exposed between the dial 10 and the holding plate M.

The light transmitting member 26 also has an annular V-shaped groove 26c formed in the back 26a. The semitranslucent layer 27 is disposed along the back 26a and an inside surface of the V-shaped groove 26c, and has a V-shaped portion 27a which corresponds to the V-shaped groove 26c. The light transmitting member 26 has an annular thinned portion 26d having a smaller thickness at a position where the V-shaped groove 26c is formed.

When the lamp 60 is lit in the dark environment, light emitted from the lamp 60 enters the orange layer 40, and is emitted from the orange layer 40 as orange light. Orange light passes through the semitranslucent layer 27, enters the light transmitting member 26 from the back 26a and is emitted from the front face 26b. Since the thinned portion 26d has a smaller thickness, the thinned portion 26d behind which the V-shaped portion 27a of the semitranslucent layer 27 is disposed is luminous in orange color in a ring shape. Since the semitranslucent layer 27 has a metallic color, the thinned portion 26d luminous brightly.

When the lamp 60 is turned off in the light environment, natural light in the vehicle enters the light transmitting member 26 from the front face 26b. A half of light having entered the light transmitting member 26 passes through the semitranslucent layer 27. The other half of light having entered the light transmitting member 26 is reflected by the semitranslucent layer 27, and again enters the light transmitting member 26 to be emitted from the front face 26b. As a result, the thinned portion 26d and the V-shaped portion 27a are luminous in a bright metallic color of the semitranslucent layer 27.

According to the fourth embodiment, the ring member 500 is luminous as a bright orange ring when the lamp 60 is lit in the dark environment, and is luminous as a bright metallic color ring when the lamp 60 is turned off in the light environment. Therefore, the speedometer looks novel and original due to the ring member 500.

Figure 9:
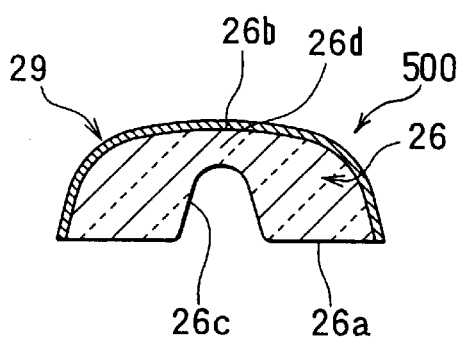
FIG. 9 is a sectional view showing the ring member according to a modification of the fourth embodiment.

As shown in FIG. 9, a semitranslucent layer 29 may be formed on the front face 26b of the light transmitting member 26 instead of the semitranslucent layer 27. In this case, when the lamp 60 is lit in the dark environment, light emitted from the lamp 60 enters the orange layer 40 and is emitted from the orange layer 40 as orange light. Orange light enters the light transmitting member 26 from the back 26a, passes through the light transmitting member 26 and is emitted from the semitranslucent layer 29. Since the thinned portion 26 has a smaller thickness, the thinned portion 26d having a center portion of the semitranslucent layer 29 in a right-left direction FIG. 9 at a front side thereof is luminous in bright orange color.

When the lamp 60 is turn ed off in the light environment, natural light in the vehicle passes through the semitranslucent layer 29 and enters the light transmitting member 26 from the front f ace 26b. Since the thinned portion 26d has a smaller thickness, the thinned portion 26d and the center portion of the semitranslucent layer 29 are luminous in a bright metallic color of the semitranslucent layer 29. Thus, the ring member 500 is luminous as a bright orange ring when the lamp 60 is lit in the dark environment, and is luminous as a bright metallic color ring when the lamp 60 is turned off in the light environment. As a result, the speedometer has a novel original look.

Figure 10:
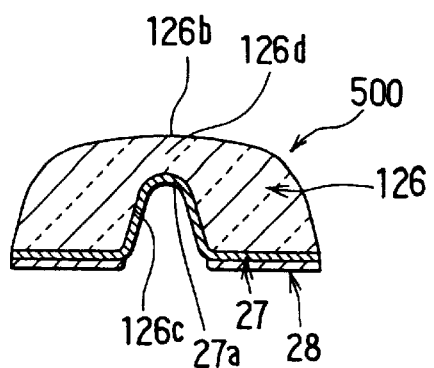
FIG. 10 is a sectional view showing the ring member according to another modification of the fourth embodiment.

Further, as shown in FIG. 10, the ring member 500 may have an opaque layer 28 through which no light passes. The opaque layer 28 is formed along a back of the semitranslucent layer 27 except the V-shaped portion 27a by printing, hot-stamping or the like. The ring member 500 has a transparent light transmitting member 126 having a front face 126b, a thinned portion 126d and a V-shaped groove 126c. When the lamp 60 is lit, orange light emitted from the orange layer 40 does not pass through the opaque layer 28 and passes through only the V-shaped portion 27a and the transparent thinned portion 126d. As a result, the ring member 500 is luminous as a bright orange ring, and a similar effect as described with reference to FIGS. 7 and 8 is obtained.

The present invention is not limited to a speedometer for a vehicle, but may be applied to various meters for a vehicle such as a tachometer. The vehicle may be a bus, a truck, a motorcycle and so on. Further, the present invention may be applied to a meter for an industrial equipment. Also, the ring member 500 according to the fourth embodiment may be applied to the first and second embodiments.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A meter comprising:

a dial;

a ring member having an annular light transmitting member allowing light to pass therethrough and disposed along a periphery of the dial, and a first colored layer having a first color and disposed on an inner side face and an outer side face of the light transmitting member, the light transmitting member having a light emitting portion for emitting light toward a front side;

a light source disposed at a rear side of the ring member, the light source emitting light when turned on; and a second colored layer having a second color and disposed between the light source and the ring member, wherein:

the second colored layer takes light emitted from the light source therein and emits light of the second color toward the ring member;

the ring member takes the light of the second color emitted from the second colored layer therein and emits the light of the second color from the light emitting portion; and the first colored layer is provided to become visible through the light emitting portion when the light source is turned off.

2. The meter according to claim 1, wherein:

the second colored layer is disposed between the light source and the dial; and the second colored layer emits the light of the second color toward the dial.

3. The meter according to claim 1, wherein:

the first colored layer is also disposed on a front face of the light transmitting member; and the light emitting portion is disposed at an outer side of the first colored layer disposed on the front face of the light transmitting member in a radial direction of the ring member.

4. The meter according to claim 3, wherein the light emitting portion has a semicircular cross section.

5. The meter according to claim 1, wherein the first colored layer blocks light.

6. A meter comprising:

a dial;

a ring member having an annular light transmitting member allowing light to pass therethrough and disposed along a periphery of the dial, and a first colored layer having a first color and disposed on an inner side face and an outer side face of the light transmitting member, the light transmitting member having a light emitting portion for emitting light toward a front side; and a light source disposed at a rear side of the ring member, the light source emitting light when turned on, wherein:

the dial has a second colored layer having a second color, the second colored layer being disposed between the light source and the ring member;

the second colored layer takes light emitted from the light source therein and emits light of the second color toward the ring member;

the ring member takes the light of the second color emitted from the second colored layer therein and emits the light of the second color from the light emitting portion; and the first colored layer is provided to become visible through the light emitting portion when the light source is turned off.

7. The meter according to claim 6, wherein the first colored layer blocks light.

8. A meter comprising:

a light transmitting dial allowing light to pass therethrough and having a light emitting portion for emitting light;

a ring member disposed along a periphery of the dial and having an opening through which the light emitting portion protrudes toward a front side;

a light source disposed at a rear side of the ring member, the light source emitting light when turned on; and a colored layer having a predetermined color and disposed between the light source and the dial, wherein:

the colored layer takes light emitted from the light source therein and emits light of the predetermined color toward the dial;

the dial takes the light of the predetermined color therein and emits the light of the predetermined color from the light emitting portion; and the colored layer reflects natural light having entered the dial from the light emitting portion as light of the predetermined color toward the dial when the light source is turned off.

9. The meter according to claim 8, wherein the light emitting portion has a semicircular cross section.

10. The meter according to claim 8, wherein the ring member blocks light.

11. The meter according to claim 8, wherein the predetermined color is different from a color of the ring member.

12. The meter according to claim 1, further comprising a semitranslucent third colored layer having a third color, wherein:

the light transmitting member has a V-shaped groove in a back thereof; and the semitranslucent third colored layer is disposed along the back of the light transmitting member and an inside surface of the V-shaped groove.

13. The meter according to claim 12, wherein the light transmitting member is decreased in thickness at the V-shaped groove.

14. The meter according to claim 12, wherein the third color is a metallic color.

15. The meter according to claim 1, further comprising a semitranslucent third colored layer having a third color and disposed along a front face of the light transmitting member through which light is emitted, wherein:

the light transmitting member has a V-shaped groove in a back thereof.

16. The meter according to claim 1, wherein the first colored layer is made of paint.

* * * * *